United States Patent
Stewart et al.

(10) Patent No.: US 10,721,957 B2
(45) Date of Patent: Jul. 28, 2020

(54) TOBACCO-DERIVED COLORANTS AND COLORED SUBSTRATES

(71) Applicant: R.J. Reynolds Tobacco Company, Winston-Salem, NC (US)

(72) Inventors: Charles Stewart, Kingsport, TN (US); Ercilia Hernandez Garcia, Clayton, NC (US); Robert Owen Bussey, III, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 792 days.

(21) Appl. No.: 15/284,704

(22) Filed: Oct. 4, 2016

(65) Prior Publication Data
US 2018/0092396 A1    Apr. 5, 2018

(51) Int. Cl.
| | | |
|---|---|---|
| *A24B 15/30* | (2006.01) | |
| *C09B 61/00* | (2006.01) | |
| *D06P 1/34* | (2006.01) | |
| *D06P 3/14* | (2006.01) | |
| *D06P 3/60* | (2006.01) | |
| *D06P 5/15* | (2006.01) | |
| *D06P 1/00* | (2006.01) | |

(52) U.S. Cl.
CPC ............ *A24B 15/307* (2013.01); *C09B 61/00* (2013.01); *D06P 1/0016* (2013.01); *D06P 1/34* (2013.01); *D06P 3/14* (2013.01); *D06P 3/60* (2013.01); *D06P 5/158* (2013.01)

(58) Field of Classification Search
None
See application file for complete search history.

(56) References Cited

U.S. PATENT DOCUMENTS

| | | |
|---|---|---|
| 4,144,895 A | 3/1979 | Fiore |
| 4,150,677 A | 4/1979 | Osborne, Jr. et al. |
| 4,289,147 A | 9/1981 | Wildman et al. |
| 4,359,059 A | 11/1982 | Brummer et al. |
| 4,589,428 A | 5/1986 | Keritsis |
| 4,605,016 A | 8/1986 | Soga et al. |
| 4,727,889 A | 3/1988 | Niven, Jr. et al. |
| 4,941,484 A | 7/1990 | Clapp et al. |
| 4,967,771 A | 11/1990 | Fagg et al. |
| 4,986,286 A | 1/1991 | Roberts et al. |
| 5,121,757 A | 6/1992 | White et al. |
| 5,131,414 A | 7/1992 | Fagg et al. |

(Continued)

FOREIGN PATENT DOCUMENTS

WO    WO 2013/165857    11/2013

OTHER PUBLICATIONS

Genencor Product List, http://primagreen.genencor.com/fileadmin/user_upload/live/primagreen/documents/genencor_textile_product_list.pdf (2011)

(Continued)

*Primary Examiner* — Phu H Nguyen
(74) *Attorney, Agent, or Firm* — Womble Bond Dickinson (US) LLP (57) ABSTRACT

Methods for obtaining natural colorants from plant material (e.g., tobacco material) and for using such natural colorants to dye various substrates are provided. Natural colorants are obtained using particular enzymes and particular conditions (e.g., time, temperature, and pH profiles). Such colorants can be used to dye substrates, for example, using conventional dyeing techniques or using unique in situ methods.

22 Claims, 4 Drawing Sheets

(56) References Cited

U.S. PATENT DOCUMENTS

| | | | |
|---|---|---|---|
| 5,131,415 | A | 7/1992 | Munoz et al. |
| 5,148,819 | A | 9/1992 | Fagg |
| 5,435,325 | A | 7/1995 | Clapp et al. |
| 5,445,169 | A | 8/1995 | Brinkley et al. |
| 6,124,127 | A | 9/2000 | Andersen et al. |
| 6,131,584 | A | 10/2000 | Lauterbach |
| 6,298,859 | B1 | 10/2001 | Kierulff et al. |
| 6,772,767 | B2 | 8/2004 | Mua et al. |
| 7,337,782 | B2 | 3/2008 | Thompson |
| 8,690,966 | B2 | 4/2014 | DeVall |
| 9,301,544 | B2 | 4/2016 | Mua et al. |
| 2011/0287681 | A1 | 11/2011 | DeVall |
| 2012/0272460 | A1 | 11/2012 | DeVall |
| 2015/0000050 | A1 | 1/2015 | DeVall |

OTHER PUBLICATIONS

Cheng et al. "Advances in Enzyme Assisted Extraction of Natural Products," *Proceedings of the 3$^{rd}$ International Conference on Material, Mechanical and Manufacturing Engineering*, 2015, pp. 371-354.

Rani et al., "Beta-Glucosidase: Key Enzyme in Determining Efficiency of Cellulase and Biomass Hydrolysis," *Journal of Bioprocessing & Biotechniques*, 2014, vol. 1, No. 5, 8 pages.

TOBACCO-DERIVED COLORANTS AND COLORED SUBSTRATES

FIELD OF THE INVENTION

The present invention relates to colorants and dyes derived from plants (e.g., tobacco) and to methods for deriving such colorants and dyes. The invention further relates to substrates, e.g., fibers and textiles treated with such colorants and dyes and to methods of providing colored substrates.

BACKGROUND OF THE INVENTION

Coloration of various substrates (e.g., textiles) can be achieved using natural colorants or synthetic colorants/pigments. Natural colorants, derived, e.g., from plants, fruits, vegetables, insects, and minerals were among the first colorants and a range of natural colorants are known and used today for various applications. For example, red colors can be derived from beets, red cabbage and red radishes; yellow/orange colors can be derived from annato, beta carotene, saffron, luteines, pomegranate, safflower, and turmeric; green colors can be derived from chlorophyll; blue/purple colors can be derived from indigo, spirulina and black carrots; and brown colors can be derived from malt and caramel. Many natural colorants require the addition of one or more chemicals, e.g., mordants, to ensure binding of the colorant to the substrate (particularly for coloring cellulosic fibers). Further, the methods traditionally used for applying natural colorants generally exhibited poor reproducibility, were time consuming, and were not environmentally friendly processes.

There are relatively few known commercial applications of natural colorants to textiles, with one principal exception to this observation being the application of indigo. Synthetic dyes are thus commonly employed for large commercial operations. However, the look of natural dyes is commonly found to be more aesthetically pleasing. With the growth of the biofuel and ethanol industries, knowledge of and development of aggressive enzymes has grown and these enzymes hold potential for enhancing the provision and use of certain natural colorants. See, e.g., U.S. Pat. No. 8,690,966 and U.S. Patent Application Publication Nos. 2015/0000050; 2012/0272460; and 2011/0287681, all to Devall., which is incorporated herein by reference. It would be beneficial to provide further natural colorants and processing techniques that can allow for the production and application of such natural colorants to a range of substrates.

SUMMARY OF THE INVENTION

The present disclosure provides natural colorants derived from tobacco materials (e.g., tobacco plants or portions thereof). Such colorants can be used for various purposes, including for dyeing fibers (e.g., natural fibers). Methods for providing such colorants from tobacco materials are also provided, which may, in some embodiments, include multiple processes (e.g., obtaining the colorants and, optionally, dyeing fibers using the colorants in a single bath).

The present disclosure provides methods for extracting natural colorants from tobacco plant materials using advanced enzymatic techniques. Specifically, in one aspect, such methods comprise the steps of: providing a first tobacco mixture by combining tobacco material with a cellulase and a beta glucosidase at a pH of about 5-6; providing a second tobacco mixture by adjusting the pH of the first tobacco mixture to a pH of about 7-8 and adding pectate lyase and xylanase to the first tobacco mixture; and separating the tobacco material from the second tobacco mixture to give a colorant-containing broth.

In some embodiments, the tobacco material from which colorants are extracted is a harvested tobacco plant or one or more portions thereof. In some embodiments, the tobacco material is in the form of a manufacturing byproduct or production waste stream.

The first providing step, in some embodiments, comprises combining the tobacco material, cellulase, and beta glucosidase at elevated temperature. The elevated temperature can be, for example, at least 38° C., e.g., about 38° C. to about 100° C., about 38° C. to about 75° C. or about 49° C. to about 71° C. In some embodiments, the first providing step comprises combining the tobacco material, cellulase, and beta glucosidase with agitation. The first providing step, in certain embodiments, comprises adding a pH modifier (e.g., a buffer) to obtain the pH of about 5-6. Exemplary pH modifiers include, but are not limited to, monosodium phosphate, disodium phosphate, and combinations thereof. In the first providing step, the cellulase and beta glucosidase are, in some embodiments, in a ratio of about 10:1 to about 3:1. In certain embodiments, the first providing step comprises preparing an enzyme mixture comprising the cellulase and beta glucosidase, adjusting the pH of the enzyme mixture, and combining the enzyme mixture and the tobacco material.

The second providing step, in some embodiments, comprises combining the first tobacco mixture, the pectate lyase, and the xylanase at elevated temperature. The elevated temperature can be, for example, at least 38° C., e.g., about 38° C. to about 100° C., about 38° C. to about 75° C., or about 49° C. to about 71° C. In some embodiments, the second providing step comprises combining the first tobacco mixture, pectate lyase, and xylanase with agitation. The second providing step, in certain embodiments, comprises adding a pH modifier (e.g., a buffer) to obtain a pH of about 7-8. Exemplary pH modifiers include, but are not limited to, monosodium phosphate, disodium phosphate, and combinations thereof. In the second providing step, the xylanase and pectate lyase are, in some embodiments, in a ratio of about 1:1 to about 5:1. In certain embodiments, the second providing step comprises preparing an enzyme mixture comprising the xylanase and pectate lyase, adjusting the pH of the enzyme mixture, and combining the enzyme mixture and the first tobacco mixture.

The colorants generated according to the disclosed methods can be used as coloring agents for a wide variety of materials/substrates. For example, such colorants can be used as inks, e.g., to color papers, plastics, ceramics, metals, and other types of materials and as dyes/pigments for textiles, e.g., to color fabrics such as for clothing, homegoods (e.g., linens, tablecloths, curtains, rugs, towels, and upholstered furnishings), automobile components, and the like. The disclosed colorants can also find use in tobacco products, including, but not limited to, as inks for product packaging and/or cigarette paper; as dyes for filter tow material and snus pouches; and as components of e-cigarettes. Furthermore, the colorants may be useful in other types of products, e.g., as food dyes, cosmetic colorants, and in paint formulations.

The present disclosure further provides methods for dyeing various substrates with natural colorants extracted from tobacco plant materials. The dyeing can, in some embodiments, be done subsequent to the provision of the colorant-containing broth by contacting a substrate with the colorant-containing broth. The dyeing can, in some embodiments, can be done in tandem with the provision of the colorant-containing broth (e.g., wherein the substrate is added during the extraction process). Advantageously, in certain embodiments, the dyeing can be conducted "in situ" within the same bath as the extracting by adding a substrate at any stage during or following the extracting method performed to provide the colorant-containing broth.

As such, in one aspect, a method of dyeing a substrate is provided, comprising: extracting colorant from a tobacco material according to the methods disclosed herein and contacting a substrate with the colorant. This method can comprise performing the extracting method and then adding a substrate. The method can comprise adding the substrate during the extracting method (e.g., during the first providing step or during the second providing step). The present disclosure also provides dyed substrates exhibiting certain desirable features, as will be described in further detail herein.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

In a first aspect, the present disclosure provides a method for obtaining natural colorants and/or dyes from plant material (e.g., tobacco material). This method generally involves extracting a colored component from the tobacco material and, in particular, extracting a colored component using particular enzymes and particular conditions (e.g., time, temperature, and pH profiles). Advantageously, in some embodiments, such methods can maximize the amount of colorant released from the tobacco material and/or can minimize the biomass remaining after the extraction process.

One exemplary method for obtaining natural colorant from a tobacco material is set forth in the schematic diagram of FIG. 1, which is described as follows. Tobacco Material 120 is combined with First Enzyme Mixture 110 to give Tobacco Mixture 1 130 and treated 20 to give Treated Tobacco Mixture 1 140. Treated Tobacco Mixture 1 140 is combined with Second Enzyme Mixture 150 to give Tobacco Mixture 2 160 and treated 22 to give the desired colorant 170. One embodiment of such a method is further outlined in the schematic diagram of FIG. 1, in which Cellulase 112, Beta-glucosidase 114, and pH modifier 116 are separately or in any combination combined with Tobacco Material 120 to give Tobacco Mixture 1 130, which is treated 20 to give Treated Tobacco Mixture 1 140. Subsequently, pectate lyase 152, xylanase 154, and pH modifier 156 are separately or in any combination combined with Treated Tobacco Mixture 1 140 to give Tobacco Mixture 2 160, which is treated 22 to give the colorant 170.

It is noted that certain processing parameters with respect to the method steps (e.g., time, temperature, pH profile, specific enzyme(s), order of addition of enzymes) identified by the inventors have led, in some cases, to significantly improved efficacy of colorant extraction from tobacco, as will be detailed further herein. One of skill in the art will recognize that FIGS. 1 and 2 provide only general overviews of particular embodiments of the method of the invention and will appreciate that the referenced components in this process can include additional components and that additional method steps may be included in the process.

The "tobacco material" 120 subjected to the methods disclosed herein encompasses a range of tobacco-containing materials. For example, in some embodiments, the tobacco material comprises tobacco plants or portions thereof, in various stages of the plant life cycle. Such tobacco plants or portions thereof include, but are not limited to, uncured tobacco plants or portions, i.e., plants or portions thereof in "green" form. By "green" in certain embodiments is meant tobacco having a form such that cells within the plant or plant component have not experienced significant or substantial cell death, and cellular respiration is capable of occurring to some degree. Such tobacco plants or portions thereof in "green" form can be processed according to the disclosed methods at various time points post-harvest (e.g., immediately after harvest or at some stage thereafter). In certain embodiments, the tobacco plants or portions thereof are processed prior to being dried (i.e., shortly after harvest).

In other embodiments, the tobacco material comprises tobacco that has been cured and/or aged. Methods for curing and aging are generally known and examples of methods for curing and/or aging tobacco are discussed, for example, in U.S. Pat. No. 1,327,692 to Beinhart; U.S. Pat. No. 2,758,603 to Heljo; U.S. Pat. No. 5,676,164 to Martin; U.S. Pat. No. 6,755,200 to Hempfling et al.; U.S. Pat. No. 7,293,564 to Perfetti et al., and U.S. Pat. No. 8,353,300 to Li et al.; and US Pat. Appl. Pub. Nos. 2010/0116281 and 2012/0279510 to Marshall et al., which are incorporated herein by reference in their entireties. Descriptions of further types of curing and aging processes for various types of tobacco are provided in Tobacco Production, Chemistry and Technology, Davis et al. (Eds.) (1999), which is also incorporated herein by reference.

For example, tobacco can be cured by methods including but not limited to, air-curing, dark air curing, sun-curing, fire curing, and flue curing. Flue curing comprises curing tobacco in enclosures wherein flues heat cure the tobacco without exposing it to smoke and is described, for example, in Nestor et al. *Beitrage Tabakforsch. Int.*, 2003, 20, 467-475 and U.S. Pat. No. 6,895,974 to Peele, which are both incorporated herein by reference. Fire cured tobacco generally comprises curing tobacco in enclosures wherein it is exposed to the gaseous combustion products of a fire that is maintained at a low smolder and is described, for example, in US Pat. Appl. Publ. 2012/0125354 to Byrd et al., which is incorporated herein by reference. Air curing typically comprises hanging tobacco in a well-ventilated enclosure to dry at ambient conditions and is described, for example, in deRoton, C. et al. *Beitrage Tabakforsch. Int.* 2005, 21, 6, 305-320; Staaf, M. et al. *Beitrage Tabakforsch Int.* 2005, 21, 6, 321-330; and U.S. Pat. No. 6,834,654 to Williams, which are incorporated herein by reference. Sun curing generally comprises allowing tobacco to cure uncovered in the sun.

Tobacco material 120 can comprise varying portions of a tobacco plant. For example, virtually all of the plant (e.g., the whole plant) can be harvested and employed as such. Alternatively, various parts or pieces of the plant can be harvested or separated for treatment after harvest. For example, the flower, leaves, stem, stalk, roots, seeds, and various combinations thereof, can be isolated for use or further treatment. Tobacco is commonly grown for its leaves, which are harvested and used, e.g., for smoking products and smokeless tobacco products. Other portions of the tobacco plant (e.g., the flower, stem, stalk, roots, and seeds) are usually less widely used (and sometimes discarded). In certain embodiments, such portions can be advantageously processed according to the disclosed methods. In particular embodiments, the tobacco material subjected to processing as disclosed herein is tobacco material other than tobacco leaf, including the portions referenced herein above as well as tobacco material that is generally considered to be "waste" or scrap (e.g., tobacco material remaining after various manufacturing or other processes).

In some embodiments, tobacco material 120 subjected to methods as disclosed herein can comprise a mixture of components, e.g., in the form of a manufacturing byproduct or production waste stream. As such, the "tobacco material" can be provided in a mixture with one or more other components, e.g., including but not limited to such compounds as sugars, proteins, undigested tobacco material, and tobacco-derived compounds. As such, the method described herein may, in some embodiments, be employed in the context of recycling waste material. Byproducts or production waste streams can be treated prior to processing as disclosed herein, e.g., to concentrate or remove certain components therefrom or can be used directly.

Tobacco material 120 can be used in intact form (e.g., in the form of plants or plant parts) or can be physically processed prior to being subjected to the disclosed method. For example, a tobacco plant or portion thereof can be separated into individual parts or pieces (e.g., leaves can be removed from stems, and/or stems and leaves can be removed from stalk). A plant or individual parts or pieces can be further subdivided into parts or pieces (e.g., leaves can be shredded, cut, comminuted, pulverized, milled or ground into pieces or parts that can be characterized as filler-type pieces, granules, particulates or fine powders). The tobacco material can, in some embodiments, be extracted prior to processing according to the methods disclosed herein (where either the extracted tobacco pulp or the tobacco extract can serve as tobacco material 120). Exemplary methods for extracting various components from tobacco include, but are not limited to, those described in U.S. Patent Application Publication No. 2011/0247640 to Beeson et al. and U.S. Pat. No. 3,144,895 to Fiore; U.S. Pat. No. 4,150,677 to Osborne, Jr. et al.; U.S. Pat. No. 4,289,147 to Wildman et al.; U.S. Pat. No. 4,359,059 to Brummer et al.; U.S. Pat. No. 4,589,428 to Keritsis; U.S. Pat. No. 4,605,016 to Soga et al.; U.S. Pat. No. 4,727,889 to Niven, Jr. et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, which are all incorporated herein by reference.

Where some or all of tobacco material 120 comprises roots and/or stalks, such components are, in some embodiments, advantageously cleaned and/or physically processed prior to use. In some embodiments, certain components, e.g., pith, parenchyma, and other non-woody materials are removed prior to treatment as disclosed herein. Roots and stalks in particular may, in some embodiments, be processed according to the methods set forth in U.S. Patent Application Publication Nos. 2012/0152265 and 2012/0192880, both to Dube et al., which are incorporated herein by reference. In certain embodiments, these components can be cleaned and processed using methods and equipment generally employed for green leaf processing. One particular method for cleaning and processing stalks includes the steps of: size reduction (e.g., by milling and threshing), screening (to give a material collected on the screen comprising cleaned root/stalk product and a screened fine material containing pith, parenchyma, and small woody pieces); and passing the small woody pieces through an air separator (which separates the pieces by density, removing non-woody pieces such as pith and parenchyma). One particular method for cleaning and processing roots includes the steps of size reduction (e.g., by milling); screening to remove dirt and fines; air separation to remove light non-woody material; threshing; additional air separation to remove light non-woody material; air separation to remove heavy contaminants; manual picking to remove foreign matter; screening (to give a material collected on the screen comprising cleaned root and a screened material which can be further used); and air separation of both materials to remove light non-woody material.

Tobacco or tobaccos to which the methods provided herein are applicable can vary. In certain embodiments, tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Pasado, Cubano, Jatim and Bezuki tobaccos), light air cured (e.g., North Wisconsin and Galpao tobaccos), Indian air cured, Red Russian and *Rustica* tobaccos, as well as various other rare or specialty tobaccos and various blends of any of the foregoing tobaccos. Descriptions of various types of tobaccos, growing practices and harvesting practices are set forth in *Tobacco Production, Chemistry and Technology*, Davis et al. (Eds.) (1999), which is incorporated herein by reference. Various representative other types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and 2008/0245377 to Marshall et al.; each of which is incorporated herein by reference. Exemplary *Nicotiana* species include *N. tabacum, N.*

*rustica, N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata, N. x sanderae, N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. simulans, N. stocktonii, N. suaveolens, N. umbratica, N. velutina, N. wigandioides, N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis subsp. Hersperis, N. pauciflora, N. petunioides, N. quadrivalvis, N. repanda, N. rotundifolia, N. solanifolia,* and *N. spegazzinii.*

Nicotiana species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Patent Appl. Pub. No. 2006/0236434 to Conkling et al.; and PCT WO 2008/103935 to Nielsen et al. See, also, the types of tobaccos that are set forth in U.S. Pat. No. 4,660,577 to Sensabaugh, Jr. et al.; U.S. Pat. No. 5,387,416 to White et al.; and U.S. Pat. No. 6,730,832 to Dominguez et al., each of which is incorporated herein by reference. Most preferably, the tobacco materials are those that have been appropriately cured and aged. Especially preferred techniques and conditions for curing flue-cured tobacco are set forth in Nestor et al., *Beitrage Tabakforsch. Int.,* 20 (2003) 467-475 and U.S. Pat. No. 6,895,974 to Peele, which are incorporated herein by reference. Representative techniques and conditions for air curing tobacco are set forth in deRoton, C. et al. *Beitrage Tabakforsch. Int.,* 2005, 21, 6, 305-320 and Staaf, M. et al. *Beitrage Tabakforsch. Int.* 2005, 21, 6, 321-330, which are incorporated herein by reference. Certain types of unusual or rare tobaccos can be sun cured. Representative Oriental tobaccos include katerini, prelip, komotini, xanthi and yambol tobaccos. Tobacco compositions including dark air cured tobacco are set forth in US Patent Appl. Pub. No. 2008/0245377 to Marshall et al., which is incorporated herein by reference. See also, types of tobacco as set forth, for example, in US Patent Appl. Pub. No. 2011/0247640 to Beeson et al., which is incorporated herein by reference. The *Nicotiana* species can be selected for the content of various compounds that are present therein. Tobacco plants can be grown in greenhouses, growth chambers, or outdoors in fields, or grown hydroponically.

Tobacco material 120 can optionally be physically processed prior to being subjected to the methods disclosed herein. The plant or portion thereof can be separated into individual parts or pieces (e.g., the leaves can be removed from the stems, the stems and leaves can be removed from the stalk, stalk can be removed from the roots, etc.). The harvested plant or individual parts or pieces can be further subdivided into parts or pieces (e.g., the leaves can be shredded, cut, comminuted, pulverized, milled or ground into pieces or parts that can be characterized as pieces, granules, particulates or fine powders). The tobacco material can have the form of processed tobacco parts or pieces, cured and aged tobacco in essentially natural lamina, stem, stalk, or root form, a tobacco extract, extracted tobacco pulp (e.g., using water as a solvent), or a mixture of the foregoing.

The manner by which the tobacco is provided in such forms can vary. The plant, or parts thereof, can be subjected to external forces or pressure (e.g., by being pressed or subjected to roll treatment). When carrying out such processing conditions, the plant or portion thereof can have a moisture content that approximates its natural moisture content (e.g., its moisture content immediately upon harvest), a moisture content achieved by adding moisture to the plant or portion thereof, or a moisture content that results from the drying of the plant or portion thereof. For example, powdered, pulverized, ground or milled pieces of plants or portions thereof can have moisture contents of less than about 25 weight percent, often less than about 20 weight percent, and frequently less than about 15 weight percent. Tobacco parts or pieces can be comminuted, ground or pulverized into a powder type of form using equipment and techniques for grinding, milling, or the like. Most preferably, the tobacco is relatively dry in form during grinding or milling, using equipment such as hammer mills, cutter heads, air control mills, or the like. In some embodiments, the specific features of a processed tobacco material can affect the resulting color and hue of the colorant-containing broth/dye produced therefrom (e.g., the level of fineness of the grind).

Figure 1:
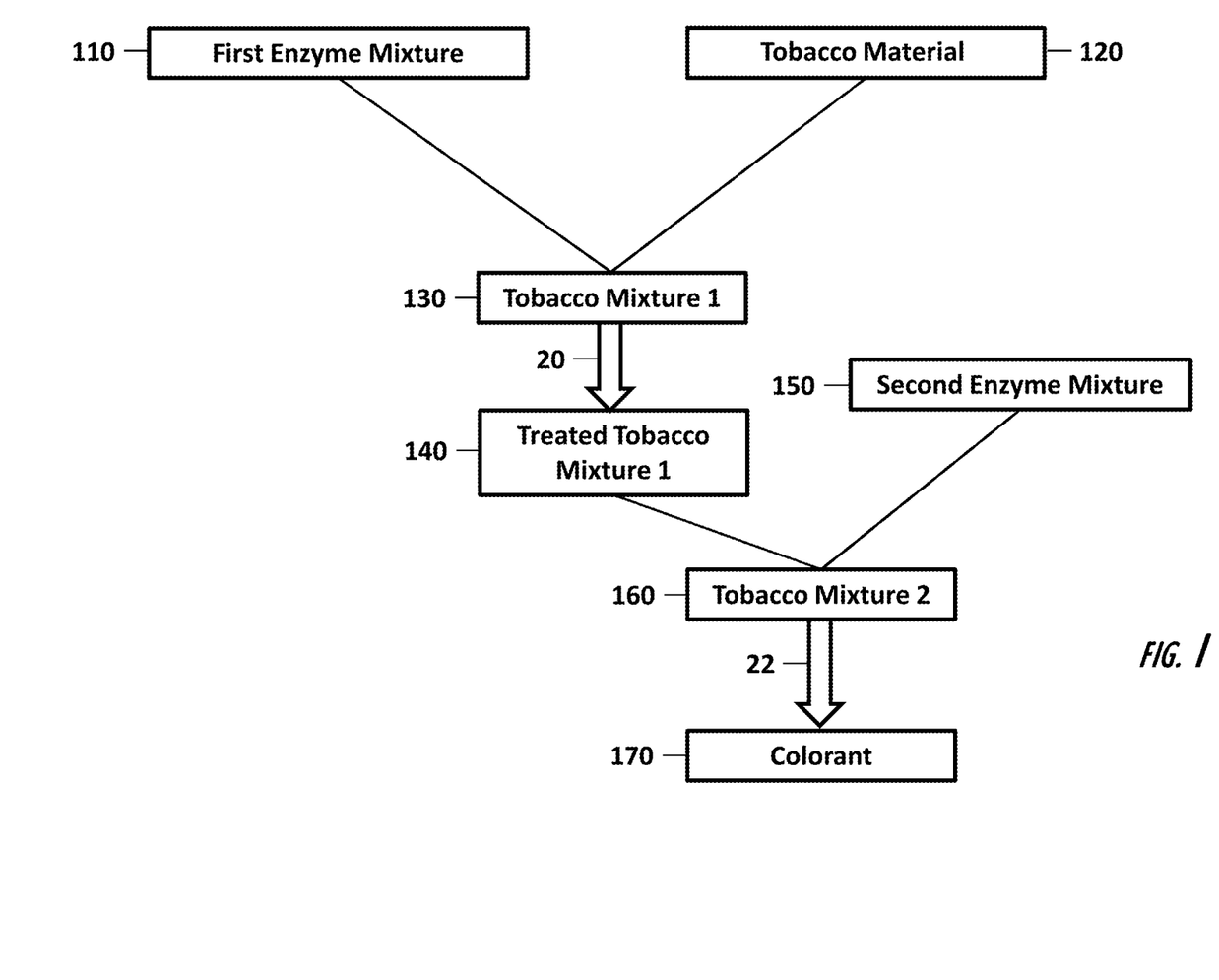
FIG. 1 is a schematic diagram providing steps of an exemplary method for the provision of tobacco-derived colorant according to one embodiment.
Figure 2:
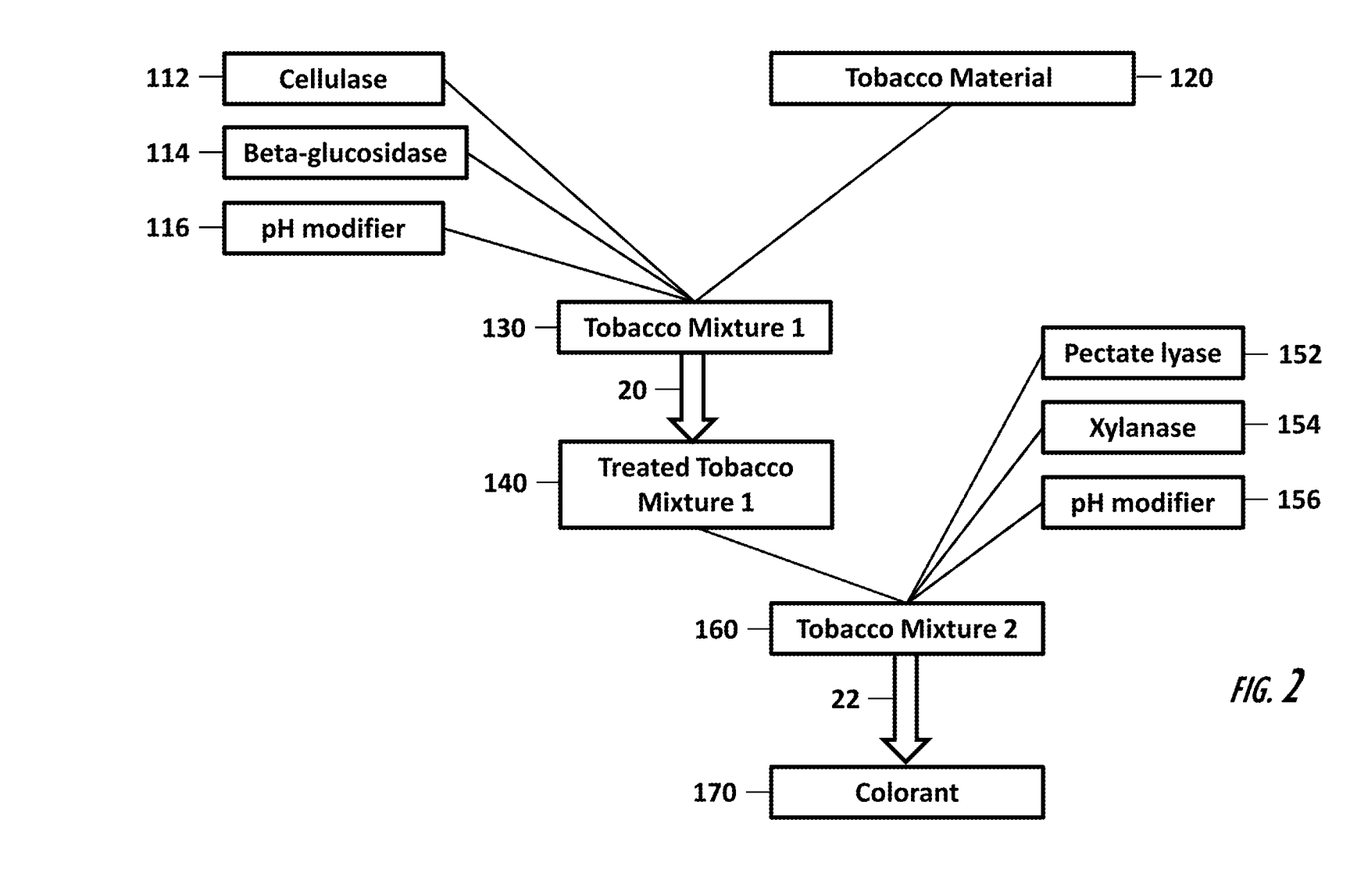
FIG. 2 is a schematic diagram providing steps of an exemplary method for the provision of tobacco-derived colorant according to a further embodiment.

The composition of the first enzyme mixture 110 of FIG. 1 can vary. Generally, this first enzyme mixture is aqueous and includes at least one enzyme. In certain preferred embodiments, the first enzyme mixture comprises a cellulase and a glucosidase. As further represented in FIG. 2, cellulase 112 and glucosidase 114 can be provided either in the form of a mixture (110 of FIG. 1) that can be combined with Tobacco Material 120 or can be separately combined therewith to give Tobacco Mixture 1 130. As such, the components employed to produce Tobacco Mixture 1 130 can be added in various sequences. For example, water and pH modifier 116 can be combined and mixed with the tobacco material, followed by the addition of the cellulase 112 and beta-glucosidase 114. As another example, water and pH modifier 116 can be combined and the cellulase and beta-glucosidase can be added, followed by the addition of the tobacco material. As such, referring back to FIG. 1, although first enzyme mixture 110 is referred to generally as a "mixture," in various embodiments, the components can be considered to be "mixed" before, during, or after contact with Tobacco Material 120 to provide Tobacco Mixture 1 130. In certain embodiments, one or more of the components may be provided in a preformed mixture. For example, a commercial enzyme mixture comprising one or more cellulases and one or more glucosidases may be used. One such commercially available mixture from DuPont™ Enzymes is MULTIFECT® CX.

Cellulases are a family of enzymes capable of breaking down (hydrolyzing) the cellulose in plant material. Various structurally and mechanistically different cellulases are known, and include, but are not limited to, endocellulases, exocellulases, cellobiases, oxidative cellulases, and cellulose phosphorylases. Certain specific cellulases include endo-1,4-beta-D-glucanase, carboxymethyl cellulase, avicelase, celludextriase, cellulase A, cellulosin AP, alkali cellulase, cellulase A 3, 9.5 cellulase, and pancellase SS. Such enzymes are commercially available, e.g., from DuPont™ Enzymes (including PRIMAFAST® family cellulases, including GOLD HSL, LUNA, LMA 400, and 200; OPTIMASE® family cellulases, including OPTIMASE CX 57E; and INDIAGE® family cellulases, including NeutraFlex, Super L, and Super GX Plus), AB Enzymes (BIOTOUCH® family cellulases and ECOSTONE® family cellulases). Any single cellulase or combination of cellulases can be employed as the cellulase component herein. The concentration of cellulase in the Tobacco Mixture 1 130 can be any amount sufficient to provide some degree of hydrolysis of the cellulose in the tobacco material. Exemplary concentrations of the one or more cellulases present therein include, but are not limited to, about 30 to about 50 weight percent of the enzymes and water present in Tobacco Mixture 1 130.

Glucosidases are a class of enzymes involved in breaking down glycogens into glucose. Exemplary glucosidases include, but are not limited to, α-glucosidase and β-glucosidase. Although any glucosidase can be employed as the glucosidase component of the first enzyme mixture, the glucosidase in some embodiments is advantageously beta-glucosidase. Beta-glucosidase specifically functions by hydrolyzing terminal, non-reducing β-D-glucosyl residues, releasing β-D-glucose. The concentration of glucosidase included in Tobacco Mixture 1 130 can be any amount sufficient to provide some degree of breakdown of the glycogens of the tobacco material. Exemplary concentrations of the one or more glucosidases present therein include, but are not limited to, about 0 to about 50 weight percent, e.g., about 5 to about 50 weight percent or about 15 to about 35 weight percent of the enzymes and water present in Tobacco Mixture 1 130.

A pH modifier is generally also employed in combination with the cellulase and beta-glucosidase to treat the Tobacco Material 120 and, as referenced above, the pH modifier 116 can be added in combination with one or more of the enzymes (e.g., as part of First Enzyme Mixture 110) or can be independently added. Advantageously, the pH of Tobacco Mixture 1 130 is about 5 to about 6.5, e.g., about 5.5 to about 6. pH modifiers include acids and bases and, particularly include buffers (i.e., certain combinations of acids and bases that are used to maintain a relatively constant pH). Compounds capable of modifying the pH can vary. Generally, any compounds known to increase or decrease the pH of a solution and/or known to buffer a solution around a given pH (depending on the starting material of the solution and the target final pH) can be used for this purpose. Representative compounds capable of modifying the pH include, but are not limited to, phosphates, acetates, citrates, carbonates, and sulfonates, with certain specific examples including, but not limited to, sodium phosphates (e.g., monosodium phosphate (MSP)) disodium phosphate (DSP), trisodium phosphate, monosodium diphosphate, disodium diphosphate, trisodium diphosphate, and tetrasodium diphosphate); soda ash, and acetic acid.

Exemplary amounts of such compounds incorporated within Tobacco Mixture 1 130 will vary depending on the starting pH of the mixture, the target pH, and the particular pH modifier(s) used. In certain embodiments, the amount of pH modifier included is that amount to provide a pH of about 5.5-6.0 and/or to buffer within this pH range. For example, when the pH modifier is MSP, a representative amount in Tobacco Mixture 1 130 may be about 5-15 g/L or about 7 to about 12 g/L, e.g., about 10 g/L. It is noted that certain enzymes operate only within certain pH ranges; accordingly, the pH in some embodiments must be adjusted to ensure good activity of the enzyme(s) in Tobacco Mixture 1 130.

The relative amounts of enzymes, pH modifier, water, and tobacco material in Tobacco Mixture 1 130 can vary. Typically, the combined dry weight of enzymes in this particular step is somewhat less than the dry weight of the tobacco material, but the amount of tobacco material in Tobacco Mixture 1 130 is not particularly limited. Although not intended to be limiting, in some embodiments, the total enzyme amount (by weight) with respect to the dry tobacco material in Tobacco Mixture 1 is roughly 50%. For example, in some embodiments, the total enzyme amount (by weight) is about 25% the dry weight of the tobacco material to about 75% the dry weight of the tobacco material. The ratio of cellulase to beta-glucosidase is generally such that a greater amount by weight of cellulase is present as compared to the amount of beta-glucosidase. For example, the cellulase and beta-glucosidase can be in a weight ratio of about 10:1 to about 3:1.

The conditions of step 20, in which Tobacco Mixture 1 130 is treated can vary. For example, this mixture can be treated at various temperatures, under various atmospheric conditions, and for various periods of time. Desirably, in some embodiments, application of heat can promote enzyme activity and as such, step 20 can, in some embodiments, comprise applying heat to Tobacco Mixture 1 130; however, useful temperatures depend on the particular enzyme(s) present in the enzyme mixture. In certain embodiments, the components can be combined and heated at a temperature of at least about 100° F. (~38° C.), at least about 120° F. (~49° C.), or at least about 140° F. (60° C.). Exemplary temperature ranges include about 100° F. to about 200° F. (~38° C. to ~93° C.) and about 120° F. to about 160° F. (~49° C. to ~71° C.). Exemplary time ranges for which the enzyme mixture and tobacco material are kept in contact under such conditions are not particularly limited and include at least about 1 hour, at least about 2 hours, at least about 3 hours, or at least about 4 hours, e.g., about 1-24 hours, 2-10 hours, or 4-6 hours. The components can be combined with or without agitation, although agitation (e.g., constant agitation) may be desirable to promote enzyme activity.

The resulting, treated tobacco mixture, Treated Tobacco Mixture 1 140 of FIG. 1 is further combined with a second aqueous enzyme mixture 150, which in preferred embodiments includes a pectate lyase and a xylanase. As further represented in FIG. 2, pectate lyase 152 and xylanase 154 can be provided either in the form of a mixture (150 of FIG. 1) that can be combined with Treated Tobacco Mixture 1 140 or can be separately combined therewith. As such, the components employed to produce Tobacco Mixture 2 160 can be added in various sequences. For example, pH modifier 156 as shown in FIG. 2 can be added to Treated Tobacco Mixture 1, followed by the addition of the enzymes, which may be added separately or together. in some embodiments, additional water is added to Treated Tobacco Mixture 1, either separately or in combination with one or more of pH modifier 156, xylanase 154, or pectate lyase 152. Referring back to FIG. 1, although Second Enzyme Mixture 150 is referred to generally as a "mixture," in various embodiments, the components can be considered to be "mixed" before, during, or after contact with Treated Tobacco Mixture 1 140 to provide Tobacco Mixture 2 160.

Pectate lyases, also referred to as pectate transeliminases, are enzymes exhibiting pectate lyase activity, i.e., enzymes that are responsible for the eliminative cleavage of de-esterified pectin, generating oligosaccharides with unsaturated galacturonosyl residues at their non-reducing ends. Various pectate lyases are described, for example, in U.S. Pat. No. 6,124,127 to Andersen et al., which is incorporated herein by reference. Commercial pectate lyases are available, etc. from DuPont™ Enzymes (including PRIMAGREEN® family pectate lyases, such as PrimaGreen® EcoScour). The concentration of cellulase in Tobacco Mixture 2 160 can vary and can be any amount sufficient to provide some degree of cleavage of de-esterified pectin. Exemplary concentrations of the pectate lyase(s) present in Tobacco Mixture 2 160 include, but are not limited to, about 0 to about 50 weight percent, e.g., about 5 to about 50 weight percent or about 15 to about 35 weight percent of the enzymes and water present in Tobacco Mixture 2 160. The amount of pectate lyase used with respect to the dry tobacco weight can also vary, e.g., from about 5% by weight with respect to the tobacco weight to about 100% by weight of the dry tobacco weight.

Xylanases are hydrolytic enzymes which randomly cleave the beta-1,4-backbone of xylan (a polysaccharide found in plant cell walls). Xylanases can range in the numbers/types of folds, specific mechanisms of action, substrate specificities, yields, rates, products, and physicochemical characteristics. Six xylanase-containing enzyme families are known and can be employed according to the present methods. Commercial xylanases are available, etc. from DuPont™ Enzymes (including OPTIMASE® family enzymes, such as OPTIMASE CX 72L and CX 255L). Exemplary concentrations of the one or more xylanases present in Tobacco Mixture 2 160 include, but are not limited to, about 0 to about 50 weight percent, e.g., about 5 to about 50 weight percent or about 15 to about 35 weight percent of the enzymes and water present in Tobacco Mixture 2 160. The amount of pectate lyase used with respect to the dry tobacco weight can also vary, e.g., from about 5% by weight with respect to the tobacco weight to about 100% by weight of the dry tobacco weight.

A pH modifier is generally also employed in combination with the pectate lyase and xylanase to treat Treated Tobacco mixture 1 and, as referenced above, the pH modifier 156 can be added in combination with one or more of the enzymes (e.g., as part of second Enzyme Mixture 150) or can be independently added. Advantageously, the pH of Tobacco Mixture 2 is about 7.5-8. Compounds capable of modifying the pH can vary. Generally, any compounds known to increase or decrease the pH of a solution or to buffer a solution around a given pH (depending, e.g., on the starting pH of Treated Tobacco Mixture 1 140, and the target pH for Tobacco Mixture 2 160) can be used for this purpose. Representative compounds capable of modifying the pH include, but are not limited to, phosphates, acetates, citrates, carbonates, and sulfonates, with certain specific examples including, but not limited to, sodium phosphates (e.g., monosodium phosphate (MSP)) disodium phosphate (DSP), trisodium phosphate, monosodium diphosphate, disodium diphosphate, trisodium diphosphate, and tetrasodium diphosphate); soda ash, and acetic acid. Exemplary amounts of such compounds incorporated within Tobacco Mixture 2 160 will vary depending on the pH of the mixture without such compounds added, the target pH, and the particular compound used. In certain embodiments, the amount of pH modifier included is that amount to provide a pH of about 7.5-8. For example, when the pH modifier is DSP, a representative amount may be about 10 to about 30 g/L or about 15 to about 25 g/L, e.g., about 20 g/L. It is noted that certain enzymes operate only within certain pH ranges; accordingly, the pH in some embodiments must be adjusted to ensure good activity of the enzymes in Tobacco mixture 2 160. One particular Tobacco Mixture 2 160 comprises disodium phosphate (DSP), pectase lyase, xylanase, and water.

The relative amounts of enzymes, pH modifier, water, and tobacco material in Tobacco mixture 2 160 can vary. Typically, the combined dry weight of enzymes in this particular step is somewhat less than the dry weight of the tobacco material, but the amount of tobacco material in Tobacco Mixture 2 160 is not particularly limited. Although not intended to be limiting, in some embodiments, the total enzyme amount (by weight) with respect to the dry tobacco material in Tobacco Mixture 2 is roughly 50%. For example, in some embodiments, the total enzyme amount (by weight) is about 25% the dry weight of the tobacco material to about 75% the dry weight of the tobacco material. The ratio of xylanase to pectate lyase is generally such that a greater amount of xylanase with respect to pectate lyase is provided. For example, the xylanase and pectate lyase can, in some embodiments, be present in a weight ratio of about 1:1 to about 5:1.

The conditions of step 22, in which second enzyme mixture 140 is combined with Tobacco Mixture 1 130 can vary. For example, the components can be combined at various temperatures, under various atmospheric conditions, and for various periods of time. Desirably, in some embodiments, application of heat can promote enzyme activity; however, useful temperatures depend on the particular enzyme(s) present in the enzyme mixture. In certain embodiments, the components can be combined and heated at a temperature of at least about 100° F. (~38° C.), at least about 120° F. (~49° C.), or at least about 140° F. (60° C.). Exemplary temperature ranges include about 100° F. to about 200° F. (~38° C. to ~93° C.) and about 120° F. to about 160° F. (~49° C. to ~71° C.). Exemplary time ranges for which the enzyme mixture and tobacco material are kept in contact under such conditions are not particularly limited and include at least about 1 hour, at least about 2 hours, at least about 3 hours, at least about 4 hours, or at least about 6 hours e.g., about 1-10 hours, 2-8 hours, or 6-8 hours. The components can be combined with or without agitation, although agitation (e.g., constant agitation) may be desirable to promote enzyme activity.

In particular embodiments, step 22 comprises a multiple-stage (e.g., two-stage) heating process, wherein the combined material is heated at a first temperature (e.g., about 60-70° C.) for a first period of time (e.g., at least about 4 hours or at least about 6 hours, e.g., 6-8 hours), and then the temperature is increased to a second, higher temperature (e.g., about 80-90° C.) for a second period of time (e.g., at least about 10 minutes, e.g., about 10 minutes to about an hour, e.g., 20-40 minutes). Advantageously, in such multiple-stage heating processes, both stages are conducted with agitation, although agitation is not required in either step.

Following contact between Tobacco Mixture 1 130 and Second Enzyme Mixture 140 and advantageously, heating in Step 22 as outlined herein above, the mixture is cooled. Methods of cooling and the atmosphere under which the mixture is cooled can vary. In one particular embodiment, the mixture is cooled to room temperature via radiation or via cooling coils; however, any means by which cooling can be effected can be employed (including simply allowing the mixture to cool without any means to promote cooling). The mixture is typically then filtered or otherwise processed to remove any solid material present therein (e.g., by passing the mixture through a coarse strainer) to give a colorant-containing "broth." The broth can be used directly as a dye or can be processed in some manner prior to use. For example, the broth can be diluted or concentrated by the addition or removal of liquid therefrom, as desired. in some embodiments, one or more additional components can be added to the broth, e.g., an additive to intensify the color, produce a different shade/hue, or to stabilize the dye.

The selection of enzymes and the sequence of enzyme addition (e.g., time, temperature and pH profiles) have been found to produce a natural colorant-containing broth that is superior to that produced via previously reported methods. The methods generally disclosed herein, for example, lead to enhanced degradation of the cellulosic structure of the tobacco plant as compared with previous methods, providing more colorant and less bio-mass remaining upon completion of the colorant extraction process. The methods disclosed herein provide an improved gamut of colors in the colorants and such methods are demonstrated to be robust and readily reproducible.

In one particular embodiment, the method for providing a tobacco-derived colorant specifically comprises: a) combining a tobacco material, water, a pH modifier, cellulase, and beta glucosidase to give a first mixture having a pH of about 5-6; b) heating the first mixture; c) adding a second pH modifier, pectate lyase, and xylanase to the heated first mixture to give a second mixture having a pH of about 7-8; d) heating the second mixture; e) cooling the heated second mixture; and f) removing solid tobacco material from the cooled mixture to give a colorant-containing broth.

The broths can contain various components in addition to the one or more chromophores that provide the color. In some embodiments, colorant broths provided herein can contain a significant amount of one or more sugars (e.g., including but not limited to, glucose, fructose, and sucrose) and sugar derivatives. In some embodiments, the colorants can comprise between about 5 and about 25% by dry weight of one or more sugars and sugar derivatives. Advantageously, the broths contain relatively low amounts of alkaloids, e.g., in certain embodiments, the broths contain less than about 5% alkaloids by dry weight or less than about 3% alkaloids by dry weight.

Figure 3A:
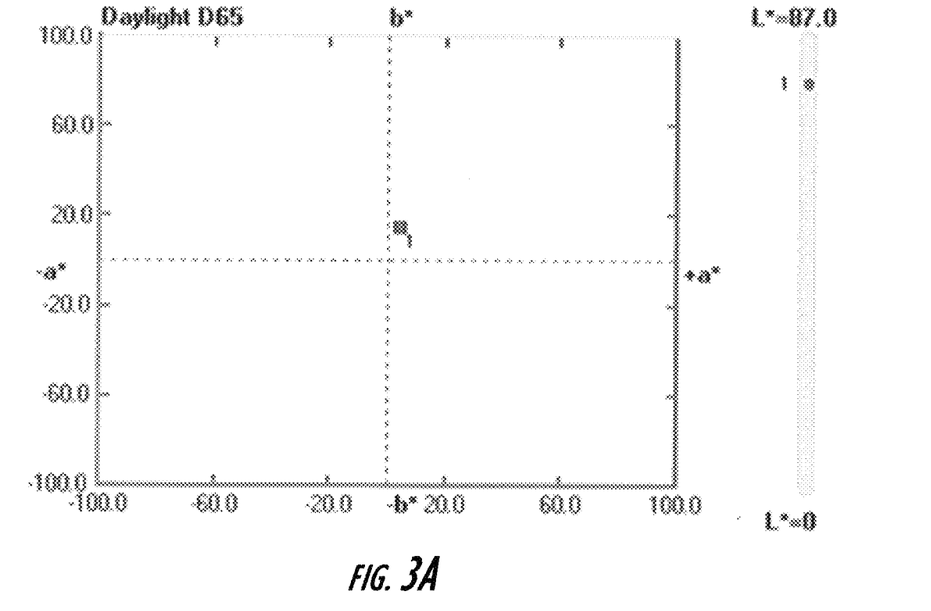
FIG. 3A is a L*a*b* plot of a cotton substrate dyed with tobacco-derived colorant.
Figure 3B:
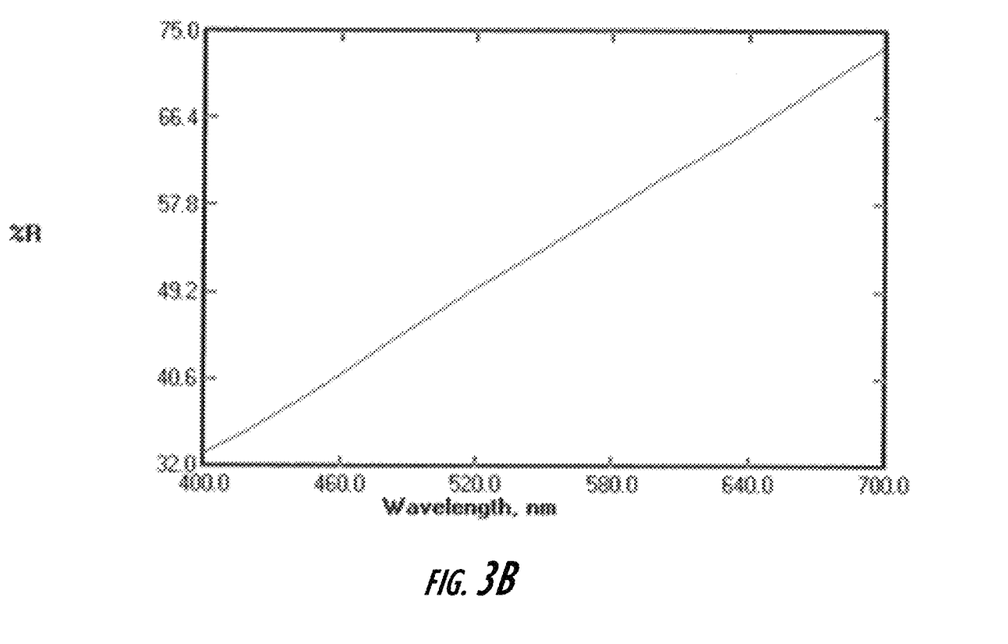
FIG. 3B is a reflectance plot of the same dyed substrate.
Figure 4A:
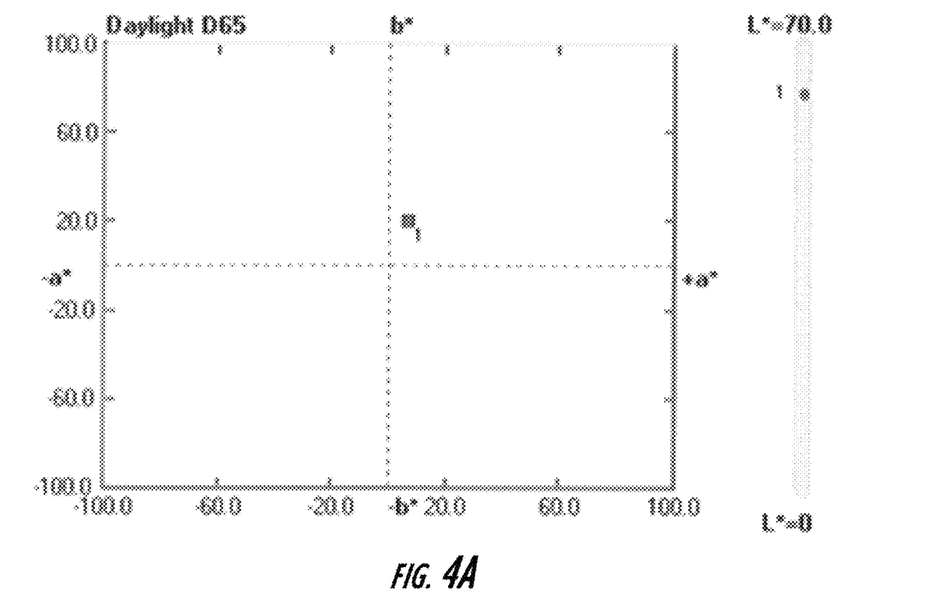
FIG. 4A is a L*a*b* plot of a cotton substrate dyed with tobacco-derived colorant.
Figure 4B:
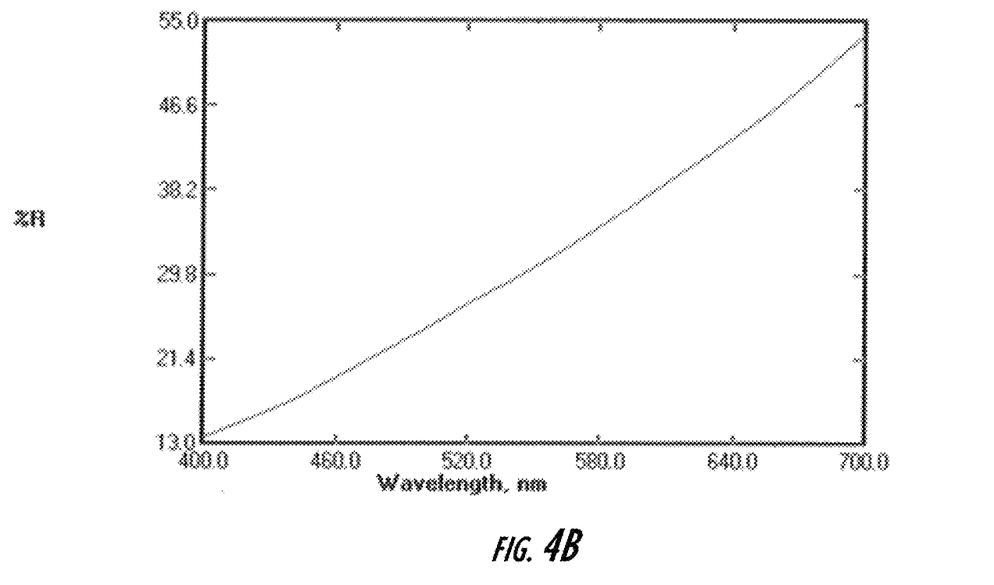
FIG. 4B is a reflectance plot of the same dyed substrate.

Furthermore, the methods for colorant extraction outlined herein have been found to provide broths comprising tobacco-derived colorants with unique spectral profiles. Such spectral profiles are believed to be very difficult, and likely impossible to reproduce, using synthetic dyes. Exemplary L*a*b* plots (FIGS. 3A and 4A) and ultraviolet/visible (UV/Vis) spectra (FIGS. 3B and 4B) for substrates dyed with tobacco-derived colorants provided according to the methods outlined herein are provided. As observed, the UV/Vis spectra of fabrics dyed with tobacco-derived colorants exhibit a unique, straight line profile.

The natural colorants extracted from plant materials as detailed herein above can be employed in various specific methods to endow various substrates with color. As such, one aspect of the present disclosure provides methods for dyeing substrates with colorants derived from plants of the *Nicotiana* species. Such methods can, in some embodiments, be analogous to methods generally used to color substrates including fibers, textiles and fabrics. Advantageously, the colorants disclosed herein do not require the inclusion of a mordant (e.g., a toxic, heavy metal mordant) in the dye solution to ensure binding of the colorant to the substrate. It is noted, however, that in some embodiments, use of a mordant can be beneficial for maximizing binding of the colorant to certain substrates. The use (or non-use) of a mordant in various situations can be dependent on the particular substrate, i.e., material to be dyed (e.g., cellulosic fibers are more likely to require a mordant for effective binding) and the conditions employed in the dyeing process.

The substrate can be in any form, e.g., in the form of fibers, woven or nonwoven textiles, fabrics, and the like. Substrate materials that can be effectively dyed using the colorants described herein are not particularly limited. Such substrates may be natural or synthetic, or can comprise a combination of natural and synthetic components. Exemplary substrates include, but are not limited to, those comprising protein fibers (e.g., wool or silk) and cellulosic fibers (e.g., cotton). In other embodiments, substrates, e.g., textiles derived from tobacco plant fibers, e.g., as disclosed in U.S. Pat. No. 8,690,966 and U.S. Patent Application Publication Nos. 2015/0000050; 2012/0272460; and 2011/0287681, all to Devall (which are incorporated herein by reference) can be dyed using the methods and/or colorants disclosed herein. Substrates can be employed in unprocessed form or can be processed prior to contact with the colorants disclosed herein. For example, the substrates can optionally be pre-pre-scoured (e.g., with a non-ionic wetting agent and/or scouring agent, such as a pectate lyase) and/or can be pre-treated, e.g., with an alkaline material (e.g., via alkaline cationic pretreatment).

In some embodiments, dyeing of substrates with the colorants disclosed herein above is particularly effective for substrates comprising protein fibers (e.g., wool and silk) and may provide enhanced depth of shade/saturation for such substrates. An enhanced depth of shade/saturation may be achieved in the absence of mordants, particularly with respect to protein fiber-containing substrates. Although cellulosic-based substrates (e.g., cotton) can be effectively dyed also without mordants, mordants can be particularly beneficial for such substrates to improve the exhaustion of the natural tobacco colorants thereon. A range of mordants are known and/or currently in development to provide this function, e.g., as described in Handbook of Natural Colorants, ed. Thomas Bechtold Wiley 2009 978-0-470-51199-2, which is incorporated herein by reference in its entirety. Exemplary, non-limiting examples of mordants include metal salts.

In certain embodiments, a colorant can be obtained as disclosed herein and optionally stored and/or processed for further use, followed by employing it to dye a given substrate. As such, dyeing can generally comprise contacting a substrate with the colorant 170, which can be employed in various forms (e.g., concentrated form, diluted form, pH-adjusted form, etc.). For example, the method can, in one embodiment, comprise contacting a substrate with colorant 170 and heating the resulting mixture (e.g., to at least about 40° C., such as between about 40° C. and about 80° C., e.g., at about 60° C.). Following this heating step, various rinsing and draining steps can be conducted using water of various temperatures. Scouring agents and pre-treatment agents can be added before or after contacting the substrate with colorant 170. The pH of the substrate-containing mixture can be adjusted as desired.

In some embodiments, it has been advantageously found that the methods of colorant production described herein above can be coupled with dyeing processes, such that the two processes can be conducted in situ. In such embodiments, for example, natural colorants are extracted from a tobacco material and are applied to one or more substrates within the same bath. Such methods are particularly applicable for the coloration of natural substrates (e.g., natural fiber-containing materials), although they are not limited thereto. Combining the extraction (to obtain the colorant) and dyeing processes into a common bath has been demonstrated to lead to a wide range of naturally colored substrates using less resources and time. These methods can, in certain embodiments, employ the same reagents as disclosed herein above; however, these regents are employed, e.g., in different combinations and/or in the presence of the substrate to be dyed.

As such, in certain embodiments, tobacco-derived colorants can be obtained and immediately transferred to substrates. In such in situ methods, a substrate is added directly to the colorant-containing broth following production. For example, the substrate can be added to the broth immediately following step 22 as represented in FIGS. 1 and 2. As such, in one embodiment, the substrate can be added when colorant 170 is at elevated temperature (from treating at an elevated temperature during step 22). Although the colorant 170 can first be cooled from elevated temperature before contacting the substrate to be dyed with the colorant, it can be advantageously in some embodiments to simply maintain the colorant-containing broth at elevated temperature for the dyeing process. In some embodiments, the substrate is added to the colorant-containing broth at elevated temperature and held at elevated temperature for a period of time, which is not particularly limited (e.g., at least about 10 minutes, at least about 20 minutes, at least about 30 minutes, at least about 60 minutes, etc.), but which is sufficient to allow for at least some transfer of color from the broth to the substrate. The dyed material can then be removed, rinsed, and dried to give a dyed substrate.

In another embodiment, the substrate to be dyed can be added at an earlier stage of the colorant production process. Other non-limiting steps at which the substrate can be added include during or after production of Tobacco Mixture 1 130, during treatment step 20, following the first enzyme treatment (by adding to Treated Tobacco Mixture 1 140), during or after production of Tobacco Mixture 2 160, or during treatment step 22. In one particular embodiment, the substrate to be dyed is added directly as a component of Tobacco Mixture 1 130 and thus is present throughout all enzyme treatment steps. It is noted that, in such embodiments, it may be beneficial to incorporate one or more additional components in any of the mixtures disclosed herein, e.g., to facilitate the dyeing. For example, in one embodiment, a pretreatment agent (e.g., an alkaline cationic pretreatment agent) is incorporated along with the substrate to be dyed. The in situ method can, in some embodiments, be advantageous in extracting color from the tobacco material and transferring such color to the substrate to be dyed with decreased oxidation prior to the transfer, e.g., without significant oxidation.

Dyed materials colored using the tobacco-derived colorants disclosed herein are generally permanently dyed or substantially permanently dyed. The dyed materials can, in some embodiments, be highly resistant to fading. The dyed materials advantageously have low content of various compounds initially associated with the tobacco material. For example, in preferred embodiments, the dyed materials contain little to no nicotine, e.g., less than about 0.1% by weight, less than about 0.09% by weight, or less than about 0.08 wt. %. The content of alkaloids other than nicotine is also advantageously low. For example, dyed materials generally comprise little to no tobacco-specific nitrosamines (TSNAs). Exemplary TSNA compounds include N-nitrosonornicotine (NNN), 4-methyl-N-nitrosamino-1-(3-pyridyl)-1-butanone (NNK), N-nitrosoanatabine (NAT), 4-methyl-N-nitrosamino-1-(3-pyridyl)-1-butanol (NNAL), and N-nitrosoanabasine (NAB). For example, in some embodiments, dyed materials prepared using the tobacco-derived colorant broths disclosed herein can contain less than about 0.02% by dry weight alkaloids other than nicotine. In certain embodiments, dyed substrates as disclosed herein uniquely exhibit a particular color independent of lighting. Typically, substrates treated with dyes and colorants exhibit different shades; however, in some embodiments, substrates treated with the tobacco-derived colorants disclosed herein exhibit color that is independent of the lighting in which they are viewed.

EXPERIMENTAL

The present invention is more fully illustrated by the following example, which is set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1: Natural Colorants Extracted from Tobacco (Plant Materials, Manufacturing by-Products, and/or Production Waste Streams) Using Advanced Enzymatic Techniques Enzymatic Extraction—Full Kettle Sequence (K Scrap Medium Grind) (Production Procedure for 20 Gallons of Raw Broth)

Water (63,560 mL) is added to a 30 gallon steam jacket kettle. To the water is added 10 g/l monosodium phosphate (MSP) (720 grams) to adjust the pH to 5.5-6.0). Primafast Gold HSL (cellulase), 33% owg (2400 g), Multifect CX 15L (cellulase, beta-glucosidase), 16.5 owg (1200 g) and K Scrap Medium (7264 g) are added to the pH-adjusted water. The resulting mixture is heated to 150° F. (65.6° C.) and held at this temperature for 4-6 hours with constant agitation. Disodium phosphate (DSP) in an amount of 20 g/L (1440 grams) to adjust the pH to 7.5-8.0, 16.5% owg PRIMAGREEN EcoScour (pectate lyase) (1200 grams), 33% owg Optimase CX 72L (xylanase) (2400 g), and water (9080 mL) are added. The temperature of this mixture is maintained at 150° F. (65.6° C.) for 6-8 hours with constant agitation. The temperature of the mixture is then increased to 185° F. (85° C.) and held at that temperature for 30 minutes with constant agitation, followed by cooling overnight via radiation. The resulting cooled mixture is filtered through a coarse strainer and stored in the refrigerator.

This general procedure was repeated for various tobacco materials to provide various colorant-containing broths. Each such broth was freeze-dried and subjected to analysis for various sugars (by LC/MSMS) and alkaloids (by GC/MS), with the results presented below in Tables 1 and 2. The various tobacco types referenced in the Tables below are as follows: "Dark-cured" is dark air cured tobacco or dark fire-cured tobacco; "Scrap A" is tobacco in finely cut/dust form after tobacco processing; "Processing waste" is a decanter pellet of tobacco material produced during protein purification, as disclosed, e.g., in U.S. Pat. No. 9,301,544, which is incorporated herein by reference in its entirety; "Low-nicotine" is a variety of tobacco; "Red Russian" is a variety of tobacco; "Scrap B" is tobacco in finely cut/dust form after tobacco processing from a different processing plant (which comprises a mixture of tobacco types).

TABLE 1

Analysis of Sugars in Colorant-Containing Broths

| Sample | Reducing Sugar (%) | Total Sugar (%) | Specific Sugars (%) | | |
|---|---|---|---|---|---|
| | | | Fructose | Glucose | Sucrose |
| Dark fire cured | 5.37 | 5.47 | 0.87 | 1.55 | <0.16 |
| Dark fire cured in situ* | 6.92 | 6.91 | 1.08 | 1.15 | <0.16 |
| Scrap A | 3.43 | 3.39 | <0.12 | 1.49 | <0.16 |
| Scrap A in situ | 3.14 | 2.95 | <0.12 | 0.75 | <0.16 |
| Processing waste | 11.5 | 11.1 | 0.32 | 7.88 | <0.16 |

TABLE 1-continued

Analysis of Sugars in Colorant-Containing Broths

| Sample | Reducing Sugar (%) | Total Sugar (%) | Fructose | Glucose | Sucrose |
|---|---|---|---|---|---|
| Processing waste in situ* | 5.9 | 5.46 | 0.37 | 1.35 | 0.19 |
| Low Nicotine variety | 10.1 | 10.1 | 2.64 | 3.99 | <0.16 |
| Low Nicotine variety in situ* | 11.6 | 11.8 | 3.49 | 3.28 | <0.16 |
| Red Russian | 16.8 | 16.6 | 4.45 | 8.92 | <0.16 |
| Red Russian in situ* | 20.4 | 20.6 | 6.52 | 9.94 | 0.4 |
| Scrap B | 12.4 | 11.9 | <0.12 | 8.12 | <0.16 |
| Scrap B in situ* | 7.27 | 6.97 | <0.12 | 2.1 | <0.16 |

*In situ samples are prepared by obtaining a colorant from the designated tobacco material and using the colorant dye to dye the designated material in the same bath.

TABLE 2

Analysis of TSNAs in Colorant-Containing Broths

| Sample | Alkaloid (%) | NAB (ng/g) | NAT (ng/g) | NNK (ng/g) | NNN (ng/g) |
|---|---|---|---|---|---|
| Dark fire cured | 0.638 | 13.7 | 358 | 152 | 463 |
| Dark fire cured in situ* | 0.846 | 19.9 | 506 | 174 | 646 |
| Scrap A | 1.74 | 120 | 2580 | 1250 | 4240 |
| Scrap A in situ* | 2.39 | 174 | 3390 | 1420 | 5600 |
| Processing waste | 0.336 | <9.77 | 40.7 | <40.3 | <40.7 |
| Processing waste in situ* | 0.422 | <10.0 | 77.5 | <41.2 | <41.6 |
| Low Nicotine variety | 0.165 | <10.0 | <40.2 | <41.4 | <41.8 |
| Low Nicotine variety in situ* | 0.158 | <10.0 | <40.1 | <41.3 | <41.7 |
| Red Russian | <0.100 | <9.93 | <39.8 | <40.9 | <41.4 |
| Red Russian in situ* | 0.138 | <9.97 | <40.0 | <41.1 | <41.5 |
| Scrap B | <0.100 | <10.4 | 43.4 | 212 | <43.4 |
| Scrap B in situ* | 0.148 | <10.3 | 51.9 | 157 | 51.9 |

*In situ samples are prepared by obtaining a colorant from the designated tobacco material and using the colorant dye to dye the designated material in the same bath.

Example 2: Dyeing of Natural Fibers with Natural Colorants Extracted from Tobacco (Plant Materials, Manufacturing by-Products, and/or Production Waste Streams) Using Combination of Natural and Textile Chemistry Dyeing Procedure—Using Color Extracted from Tobacco The fabric dyed is 1500 grams, 100% cotton knit greige. The fabric is first treated in a Optidye Sample Dye machine (rated 5 pound maximum capacity), which is a garment dye extractor. The fabric is prepared by pre-scouring by the following process. First, the fabric is loaded into a dye machine (approximately 1000 g) and the machine is filled to 20 liters using cold water. Non-ionic wetting agent (Rucowet FIN Concentrate, from Rudolf) (3 g) is added and PrimaGreen EcoScour (pectate lyase from Dupont™ Enzymes) (30 g) is added. The mixture is heated to 65° C. and held at that temperature for 30 minutes, after which time the machine is drained and filled to 20 liters using cold water. The mixture is rinsed for 3 minutes, drained, and the water is removed using an extraction spin cycle (250 rpm/2 minutes).

The fabric is next subjected to cationic polymer pretreatment. The machine is filled to 15 liters using cold water and PT92L (Organic Chem. cationic polymer) (10% owg, 150 g) is slowly added over 6 minutes. The resulting mixture is held for 10 minutes, followed by the addition of 5% owg soda ash (75 g) slowly over 4 minutes. The mixture is heated to 60° C. and held at that temperature for 60 minutes, after which time the machine is drained and filled to 20 liters using cold water. Optionally, acetic acid 56% (40 g) is added. The material is rinsed for 5 minutes and drained with no extraction.

The fabric is then treated with natural colorant coupled with cationic polymer. The dye machine is filled to 15 liters using cold water and the machine is run/agitated for 5 minutes. Tobacco-derived colorant-containing broth (as prepared according to Example 1, above) is added slowly over 6 minutes. The mixture is heated to 60° C. and held at that temperature for 60 minutes, after which time the machine is drained and filled to 20 liters using cold water. The material is rinsed for 3 minutes, the machine is drained, and filled to 20 liters using hot water. Non-ionic scouring agent (5 g) is added to the mixture and the mixture is heated to 85° C. and soaked at that temperature for 3 minutes, after which time the machine is drained and filled to 20 liters using tempered water. The material is rinsed for 3 minutes, drained, and the machine is filled to 15 liters using cold water. The material is rinsed for 3 minutes, after which time the machine is drained and the material extracted (250 rpm/2 minutes). The colored fabric is tumble dried for 45 minutes at 70° C.

Example 3: In Situ Extraction of Natural Colorants Extracted from Tobacco (Plant Materials, Manufacturing by-Products, and/or Production Waste Streams) Coupled with Application to Natural Fibers in the Same Bath In Situ Extraction and Dyeing Process A:

In a 500 mL Erlenmeyer flask, tobacco raw material (20 g), GC (cellulase, beta gluconase) (10 g), 72L (xylanase) (10 g), DSP to pH 8, and water to a total volume of 200 mL are combined. The mixture is heated solely with constant agitation to 60° C. and held at that temperature for 60-120 minutes. Alkaline cationic pre-treated cotton (pre-wet and squeezed) is added (10 g) and the mixture is held at 60° C. for 30-60 minutes. The dyed cotton is removed and rinsed (cold water/hot water/cold water). A substantial portion of the water is removed from the dyed cotton by an extraction/spin cycle and the cotton is tumble dried.

In Situ Extraction and Dyeing Process B:

In a 500 mL Erlenmeyer flask, greige cotton knit (10 g), PT92L alkaline cationic pretreatment (0.6 g), tobacco raw material (10 g), GC (cellulase, beta gluconase) (5 g), 72L (xylanase) (5 g), DSP to pH 8.5, and water to a total volume of 200 mL are combined. The mixture is heated solely with constant agitation to 60° C. and held at that temperature for 60-120 minutes. The dyed cotton is removed and rinsed (cold water/hot water/cold water). A substantial portion of the water is removed from the dyed cotton by an extraction/spin cycle and the cotton is tumble dried.

Colored fabric samples prepared according to Examples 2 and 3 are subjected to analysis by GC/MS to determine content of anabasine, anatabine, myosmine, nicotine, nornicotine, tobacco-specific nitrosamines (NAB, NAT, NNK, NNN) and total alkaloids. The results of the testing are provided in Tables 3 and 4, below.

TABLE 3

Analysis of Specific Alkaloids in Colored Fabrics

| Sample | Anabasine (%) | Anatabine (%) | Myosmine (%) | Nicotine (%) | Nicotine mg/cig# | Nornicotine (%) |
|---|---|---|---|---|---|---|
| Cotton: control | <0.0009 | <0.0009 | <0.0009 | <0.0775 | <0.77 | <0.0096 |
| Cotton: scrap B | <0.0009 | <0.0009 | <0.0009 | <0.0779 | <0.78 | <0.0097 |
| Cotton: scrap A | <0.0009 | <0.0009 | <0.0009 | <0.0779 | <0.78 | <0.0097 |
| Cotton: processing waste | <0.0009 | <0.0009 | <0.0009 | <0.0780 | <0.78 | <0.0097 |
| Cotton: dark fire cured | <0.0009 | <0.0009 | <0.0009 | <0.0778 | <0.78 | <0.0097 |
| Cotton: in situ* scrap B | <0.0009 | <0.0009 | <0.0009 | <0.0771 | <0.77 | <0.0096 |
| Cotton: in-situ scrap A | 0.0018 | 0.0009 | 0.009 | <0.0780 | <0.78 | 0.0097 |
| Cotton: in situ* processing waste | <0.0009 | <0.0009 | <0.0009 | <0.0776 | <0.78 | <0.0096 |
| Cotton: in situ* dark fire cured | <0.0009 | <0.0009 | <0.0009 | <0.0782 | <0.78 | <0.0097 |
| Cotton: in situ* low nicotine | <0.0009 | <0.0009 | <0.0009 | <0.0780 | <0.78 | <0.0097 |
| Cotton: in situ* Red Russian | <0.0009 | <0.0009 | <0.0009 | <0.0777 | <0.78 | <0.0097 |
| Cotton: low nicotine | <0.0009 | <0.0009 | <0.0009 | <0.0781 | <0.78 | <0.0097 |
| Cotton: Red Russian | <0.0009 | <0.0009 | <0.0009 | <0.0778 | <0.78 | <0.0097 |
| Wool: control | No results (contaminated sample) | | | | | |
| Wool: scrap B | <0.0009 | 0.0074 | <0.0009 | <0.0778 | <0.78 | <0.0097 |
| Wool: in situ* scrap B | <0.0009 | <0.0009 | <0.0009 | <0.0779 | <0.78 | <0.0097 |
| Wool: scrap A | <0.0009 | <0.0009 | <0.0009 | <0.0780 | <0.78 | <0.0097 |
| Wool: processing waste | <0.0009 | <0.0009 | <0.0009 | <0.0781 | <0.78 | <0.0097 |
| Wool: dark cure | <0.0009 | <0.0009 | <0.0009 | <0.0769 | <0.77 | <0.0097 |
| Wool: in-situ* scrap A | <0.0009 | 0.0041 | <0.0009 | <0.0778 | <0.78 | 0.0097 |
| Wool: in situ* processing waste | <0.0009 | <0.0009 | <0.0009 | <0.0774 | <0.77 | <0.0096 |
| Wool: in situ* dark fire cured | <0.0009 | <0.0009 | <0.0009 | <0.0779 | <0.78 | <0.0097 |
| Wool: in situ* low nicotine | <0.0009 | <0.0009 | <0.0009 | <0.0772 | <0.77 | <0.0096 |
| Wool: in situ* Red Russian | <0.0009 | <0.0009 | <0.0009 | <0.0773 | <0.77 | <0.0096 |
| Wool: Low nicotine | <0.0009 | <0.0009 | <0.0009 | <0.0773 | <0.77 | <0.0096 |
| Wool: Red Russian | <0.0009 | <0.0009 | <0.0009 | <0.0780 | <0.78 | <0.0097 |

*In situ samples are prepared by obtaining a colorant from the designated tobacco material and using the colorant to dye the designated material in the same bath.
Mg/cig units are roughly equivalent to mg/g

TABLE 4

Analysis of Specific TSNAs and Total Alkaloids in Colored Fabrics

| Sample | TSNA Content (ng/g) | | | | Total Alkaloids (%) | |
|---|---|---|---|---|---|---|
|  | NAB | NAT | NNK | NNN | with nicotine | without nicotine |
| Cotton: control | <7.51 | <30.1 | <31.0 | <31.3 | <0.0898 | <0.0123 |
| Cotton: scrap B | <7.58 | <30.4 | <31.3 | <31.6 | <0.0903 | <0.0124 |
| Cotton: scrap A | <7.67 | <30.7 | <31.6 | <31.9 | <0.0903 | <0.0124 |
| Cotton: processing waste | <7.16 | <28.7 | <29.5 | <29.8 | <0.0904 | <0.0124 |
| Cotton: dark fire cured | <7.09 | <28.4 | <29.2 | <29.5 | <0.0902 | <0.0124 |
| Cotton: in situ* scrap B | <7.70 | <30.9 | <31.8 | <32.1 | <0.0894 | <0.0123 |
| Cotton: in-situ* scrap A | <7.78 | <31.2 | <32.1 | <32.4 | <0.0913 | 0.0133 |
| Cotton: in situ* processing waste | <7.48 | <30.0 | <30.8 | <31.1 | <0.0899 | <0.0123 |
| Cotton: in situ* dark fire cured | <7.56 | <30.3 | <31.2 | <31.5 | <0.0906 | <0.0124 |
| Cotton: in situ* low nicotine | <7.51 | <30.1 | <30.9 | <31.3 | <0.0904 | <0.0124 |
| Cotton: in situ* Red Russian | <7.97 | <32.0 | <32.9 | <33.2 | <0.0901 | <0.0124 |
| Cotton: low nicotine | <7.50 | <30.1 | <30.9 | <31.2 | <0.0905 | <0.0124 |
| Cotton: Red Russian | <7.40 | <29.6 | <30.5 | <30.8 | <0.0902 | <0.0124 |
| Wool: control | No results (contaminated sample) | | | | | |
| Wool: scrap B | <7.56 | <30.3 | <31.2 | <31.5 | <0.0967 | <0.0189 |
| Wool: in situ* scrap B | <7.35 | <29.5 | <30.3 | <30.6 | <0.0903 | <0.0124 |
| Wool: scrap A | <7.60 | <30.5 | <31.3 | <31.7 | <0.0904 | <0.0124 |
| Wool: processing waste | <7.54 | <30.2 | <31.2 | <31.4 | <0.0905 | <0.0124 |
| Wool: dark fire cured | <7.19 | <28.8 | <29.6 | <29.9 | <0.0892 | <0.0123 |
| Wool: in-situ* scrap A | <7.57 | <30.4 | <31.2 | <31.5 | <0.0934 | <0.0156 |
| Wool: in situ* processing waste | <8.03 | <32.2 | <33.1 | <33.4 | <0.0897 | <0.0123 |
| Wool: in situ* dark fire cured | <7.15 | <28.7 | <29.5 | <29.8 | <0.0903 | <0.0124 |
| Wool: low nicotine | <7.27 | <29.1 | <30.0 | <30.3 | <0.0896 | <0.0123 |
| Wool: Red Russian | <7.47 | <29.9 | <30.8 | <31.1 | <0.0904 | <0.0124 |
| Wool: in situ* low nicotine | <7.91 | <3.17 | <32.6 | <32.9 | <0.0895 | <0.0123 |
| Wool: in situ* Red Russian | <7.42 | <29.7 | <30.6 | <30.9 | <0.0896 | <0.0123 |

*In situ samples are prepared by obtaining a colorant from the designated tobacco material and using the colorant to dye the designated material in the same bath Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of extracting colorant from a tobacco material, the method comprising:
   providing a first tobacco mixture by combining the tobacco material with a cellulase and a beta glucosidase at a pH of about 5-6;
   providing a second tobacco mixture by adjusting the pH of the first tobacco mixture to a pH of about 7-8 and adding pectate lyase and xylanase to the first tobacco mixture; and
   separating the tobacco material from the second tobacco mixture to give a colorant-containing broth.

2. The method of claim 1, wherein the tobacco material is a harvested tobacco plant or one or more portions thereof.

3. The method of claim 1, wherein the tobacco material is in the form of a manufacturing byproduct or production waste stream.

4. The method of claim 1, wherein the first providing step comprises combining the tobacco material, cellulase, and beta glucosidase at elevated temperature.

5. The method of claim 4, wherein the elevated temperature is at least 38° C.

6. The method of claim 4, wherein the elevated temperature is about 49° C. to about 71° C.

7. The method of claim 1, wherein the first providing step comprises combining the tobacco material, cellulase, and beta glucosidase with agitation.

8. The method of claim 1, wherein the first providing step further comprises adding a pH modifier to obtain the pH of about 5-6.

9. The method of claim 8, wherein the pH modifier is selected from the group consisting of monosodium phosphate, disodium phosphate, and combinations thereof.

10. The method of claim 1, wherein the cellulase and beta glucosidase in the first providing step are in a ratio of about 10:1 to about 3:1.

11. The method of claim 1, wherein the first providing step comprises preparing an enzyme mixture comprising the cellulase and beta glucosidase, adjusting the pH of the enzyme mixture, and combining the enzyme mixture and the tobacco material.

12. The method of claim 1, wherein the second providing step comprises combining the first tobacco mixture, the pectate lyase, and the xylanase at elevated temperature.

13. The method of claim 12, wherein the elevated temperature is at least 38° C.

14. The method of claim 12, wherein the elevated temperature is about 49° C. to about 71° C.

15. The method of claim 1, wherein the second providing step further comprises adding a pH modifier to obtain the pH of about 7-8.

16. The method of claim 15, wherein the pH modifier is selected from the group consisting of monosodium phosphate, disodium phosphate, and combinations thereof.

17. The method of claim 1, wherein the xylanase and pectate lyase in the second providing step are in a ratio of about 1:1 to about 5:1.

18. The method of claim 1, wherein the second providing step comprises preparing an enzyme mixture comprising the xylanase and pectate lyase, adjusting the pH of the enzyme mixture, and combining the enzyme mixture and the first tobacco mixture.

19. A method of dyeing a substrate, comprising:
   extracting colorant from a tobacco material according to the method of claim 1;
   contacting the substrate with the colorant.

20. A method of dyeing a substrate, comprising:
   performing the method of claim 1, and further comprising adding the substrate.

21. The method of claim 20, wherein the substrate is added during the first providing step.

22. The method of claim 20, wherein the substrate is added during the second providing step.

* * * * *